R. M. HOE.

Printing-Machine.

No. 8,346. Reissued July 23, 1878.

Witnesses;

Geo. H. Graham.

L. H. Todd

Inventor;

Richard M. Hoe.

by Munson & Philipp

Attorneys.

H. PETERS, PHOTO-LITHOGRAPHER, WASHINGTON, D. C.

UNITED STATES PATENT OFFICE.

RICHARD M. HOE, OF NEW YORK, N. Y.

IMPROVEMENT IN PRINTING-MACHINES.

Specification forming part of Letters Patent No. 162,651, dated April 27, 1875; Reissue No. 8,346, dated July 23, 1878; application filed February 19, 1877.

*To all whom it may concern:*

Be it known that I, RICHARD M. HOE, of the city, county, and State of New York, have invented certain Improvements in Printing-Machines, of which the following is a specification:

My invention relates to printing-presses which print from a web or roll of paper and print on both sides, or perfect the sheet; and it consists in a novel construction, combination, and arrangement of parts, and has for its object to prevent the ink on the printed side of the sheet setting off on the second impression-cylinder, between which and the second type-cylinder the sheet passes for its second impression, as will be fully hereinafter set forth.

Figure 1:
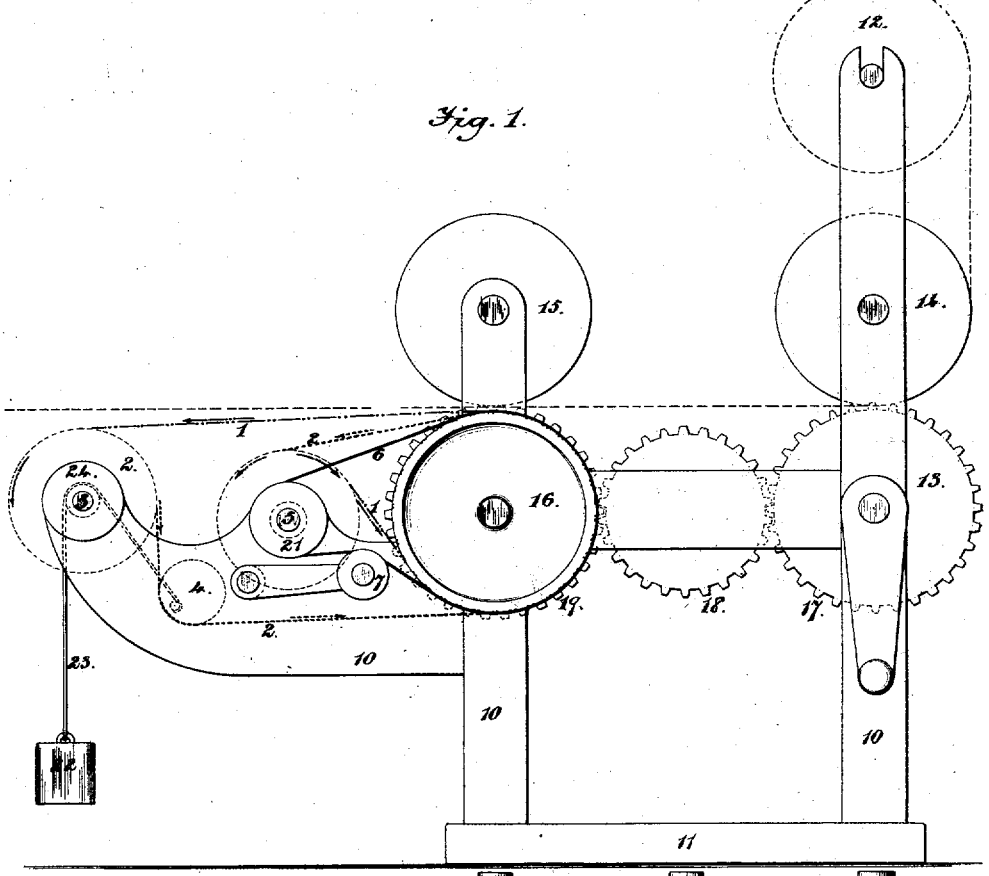
Figure 2:
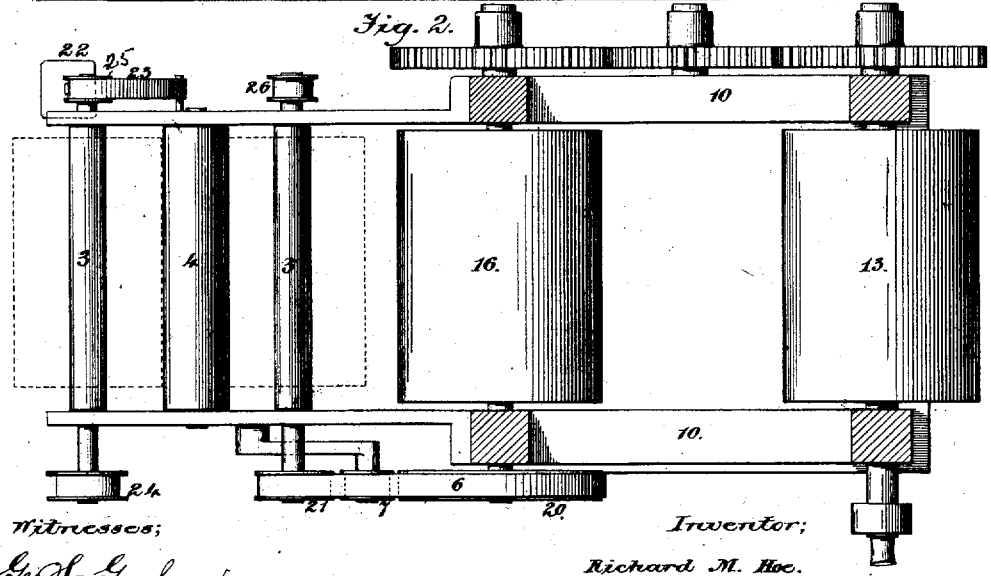

Figure 1 is a side elevation. Fig. 2 is a plan or top view, partly in section.

10 are the side frames of the machine; 11, the bed; 12, a web or roll of paper to be printed; 13, the type or stereotype cylinder for printing the first side of the paper; 14, its impression-cylinder; 15, the second type-cylinder for printing the second side of the paper, and 16 is its impression-cylinder. The cylinders 13 and 16 are geared together by the three gear-wheels 17 18 19, so as to revolve in unison.

The paper from the roll 12 passes between the two pairs of printing and impression cylinders, and is thus printed on both sides. The ink on the freshly-printed side of the sheet would set off on the second impression-cylinder 16, and after a revolution of this cylinder the printing would be a blur; and to obviate this I interpose a web or strip of paper between the impression-cylinder and the printed side of the paper, on which the set off is received.

2 is the web or strip of paper rolled on the spindle or winder 3, which web is led under the roller 4 and to and around the impression-cylinder 16, between it and the printed paper, and thus it, instead of the cylinder, receives the set off from the latter. The set-off web is carried forward by the pressure on the printed paper, and must necessarily run at the same speed, and it is received and wound up on the spindle or winder 5. This spindle is driven by a belt, 6, from a pulley, 20, on the outer end of the shaft of the impression-cylinder 16, to a flanged pulley, 21, on the spindle 5. The tension of this belt is regulated by the tightening-pulley 7, so that as the roll on the spindle 5 increases in diameter, and consequently turns slower, the belt slips around on the flanged pulley 21. 22 is a weight attached to a strap, 23, that hangs over a pulley, 25, on the end of the spindle of the roll 3, and thus makes sufficient friction to cause the paper that is being drawn off from the spindle 3 to be tightly stretched.

When the paper has entirely run off the spindle 3 onto the spindle 5 the machine is stopped, and the belt 6 is taken off and replaced by one that will connect the pulley 20 to the flanged pulley 24 on the end of the spindle 3, and the friction-strap and weight 22 are transferred to a pulley, 26, on the spindle 5. The end of the roll of paper on the spindle 5 is then passed under, up, and around the impression-cylinder 16, but between it and the printed paper, as before described, and thence onto the spindle 3, to which it is attached, and, by the operation of the machine, rewound onto it, but, it will be observed, with the opposite side presented to receive the set-off from the printed sheet, thus giving the set-off ink on the first side time to dry before it is again brought in contact with the printed paper.

The position and direction of the set-off web can be readily traced by the dotted lines, and the broken and dotted lines, and the arrows by their sides; but for the purpose of clear illustration is marked 2 in its first-described position and 1 in its position lastly described.

After the paper has become too thickly coated with the set-off ink to be of longer use, it can readily be replaced by a new web.

I claim—

1. The combination, with the second type and impression cylinders of a perfecting printing-press, an offset-web, and its winding-pulleys, of means for alternately winding the said web from one pulley-shaft around the said impression-cylinder and onto the companion pulley-shaft, and then rewinding the same in the reverse direction, all substantially as described.

2. The combination, with the impression-cylinder 16, of the offset-web, its winding-pulleys 3 5, and suitable gearing for driving the pulleys alternately in opposite directions to wind the offset-web from one pulley-shaft to the other, whereby opposite sides of said offset web or sheet are alternately presented to the printed surface, substantially as described.

3. The combination of impression-cylinder 16, offset-web, winding-pulleys 3 5, guide-roll 4, and suitable gearing for driving the pulleys 3 5 alternately in opposite directions, substantially as described.

4. The combination of impression-cylinder 16, offset-web, winding-pulleys, gearing to alternate the motion of the winding-pulleys, and a suitable tension device changeable from one pulley to the other, substantially as described.

In testimony whereof I have hereunto signed my name in the presence of two subscribing witnesses.

RICHD. M. HOE.

Witnesses:
H. T. MUNSON,
L. H. TODD.